United States Patent
Ortega et al.

(10) Patent No.: US 6,286,407 B2
(45) Date of Patent: *Sep. 11, 2001

(54) METHOD FOR THE REMOVAL OF AN EXTRANEOUS PORTION OF A PRODUCE ITEM

(75) Inventors: Edward Ortega, Salinas; Carlos Ortega, Watsonville, both of CA (US)

(73) Assignee: Finepro, LLC, Salinas, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/083,641

(22) Filed: May 22, 1998

(51) Int. Cl.$^7$ ........................................... B26D 1/02
(52) U.S. Cl. .................. 83/857; 83/856; 83/56; 99/637
(58) Field of Search ................ 83/857, 856, 932, 83/56, 57, 875; 99/642, 637

(56) References Cited

U.S. PATENT DOCUMENTS

| | | | |
|---|---|---|---|
| 1,436,721 | * 11/1922 | Newell | 83/856 |
| 3,890,867 | * 6/1975 | Wilson | 83/856 |
| 5,765,472 | * 6/1998 | Kim | 83/857 X |

* cited by examiner

Primary Examiner—Lee Young
Assistant Examiner—Rick Kiltae Chang
(74) Attorney, Agent, or Firm—Beyer Weaver & Thomas LLP

(57) ABSTRACT

Method for the rapid cleaning of produce with minimal loss, and apparatus to perform the method. The cleaning method taught in the present application enables the rapid cleaning of produce by removing an extraneous portion therefrom, by separating the extraneous portion from the body of the produce, and by urging the cleaned produce towards a collection device. These steps are attainable, using the principles of the present invention, by a working using only one motion and one hand. To perform the method, a novel aperture knife is taught which, rendered attachable to an agricultural processing implement by an integral attachment device, enables one-handed operation by a user. The knife includes a generally planar knife body in operative combination with an elevated blade which not only enables the severing of the extraneous portion from the produce body, but separates the extraneous portion therefrom, and guides the cleaned produce body towards a collection device, for instance a picking box.

4 Claims, 7 Drawing Sheets

METHOD FOR THE REMOVAL OF AN EXTRANEOUS PORTION OF A PRODUCE ITEM

TECHNICAL FIELD

The present invention relates to the cleaning or preparation of fruits and vegetables, especially that cleaning which requires the removal of a portion of the fruit or vegetable. More particularly, the present invention teaches a method for removing the calyxes from fruit, especially pulpy fruit including berries, during the harvesting or packing process.

BACKGROUND OF THE INVENTION

Strawberries are an important crop in many areas of the country. Most familiar to retail consumers are the one- or two-pint baskets of berries commonly found at grocers. This type of harvesting is characterized by the grower picking substantially "perfect" berries just before they are completely ripe. Such market harvest is typically performed so that the part of the berry immediately adjacent to the calyx, hereinafter the "shoulder", is green, or white in color. Final ripening of the berry occurs in the basket during transport to the market. In addition to this "market" sale of harvested berries, strawberries are commonly harvested and processed for at least two other uses.

A first alternative use for strawberries is the sale of berries, typically including bruised or damaged fruit, to packers for juice purposes. Strawberry juice is a product which is widely used in the manufacture of jams, preserves, strawberry filling, and other manufactured items requiring strawberry taste and sugar but which do not require whole or partial berry fruit. As might be expected, the sale of strawberries in this form is the least profitable of any of the harvest methodologies. Such use does however retain to the grower some profit for his efforts.

Berries are also sold to packers and other processors as substantially intact fruit, less those portions of the fruit not generally deemed edible. This is done by removing the calyxes from the fruit. Calyx removal can be accomplished either in packing houses or in the field by the harvest workers, and is typically accomplished by nothing more sophisticated than the removal of the calyx from the top of the berry with the worker's thumb or thumbnail. While this harvesting method results in the sale of fruit having an increased market value over berry juice, the methodology whereby calyxes are removed during processing or harvest results in several deleterious factors. Again, this produce item is sold by weight. Accordingly, it is economically important to the grower that the removal of the strawberry calyx removes a minimal amount of fruit by weight, and also does minimal damage to the berry whereby juice leakage occurs, again causing the grower weight, and thus profit, loss. This form of packaging is therefor typically performed on completely ripe fruit, as opposed to the previously discussed ripening fruit.

A first problem with the simple manual removal of calyxes from berries is the attendant and inherent lack of sanitation in the process. A second problem with this methodology is that it is inherently wasteful. The workers typically crush or destroy a significant part of each individual ripe berry as they remove the calyx utilizing this crude methodology. Moreover, the simple crushing or pinching of the upper part of the berry not only tends to remove more of the berry, and hence its value, than would be the case were the berry cleaned in a more orderly fashion, but the crushing of the upper part of the berry results in further loss of juice and increased spoilability of the harvested crop. Indeed, a crushed berry is very difficult, if not impossible, to effectively wash and sanitize prior to packaging. Finally, to enable the previously discussed manual means of calyx removal, the grower must allow the berries to remain on the stem for an additional 4–8 days longer than berries harvested for market. This means that the decision to make the former type of harvest is irrevocable.

In order to economically process berries by removing the calyx and a portion of the upper part of the berry so that the berries can be sold in their cleaned state, either the previously discussed crude manual methodology is employed, or the berries are removed to packing houses where workers clean them manually using knives and cutting boards. This latter methodology presents the disadvantage of handling each berry twice and imparts an additional manpower expense to the harvest process. Further, this subjects the berries to additional damage due to the additional handling.

What is needed is a methodology, and an apparatus to perform the methodology, which enables workers, particularly field workers, to rapidly and efficiently clean the berries as they are harvested. The methodology should enable the rapid removal of calyxes and a portion of the upper strawberry leaving the balance of the berry substantially uncrushed, or with reduced crushing, and with a neat sanitary cut as opposed to a crudely crushed upper surface, which leaks juice and pulp, thereby minimizing fruit loss. The methodology should enable and facilitate sanitation of the apparatus in field conditions. The apparatus should be safe for workers to use and minimize danger to the workers' hands while processing the berries under the extreme time pressures occasioned by the berry harvest. The methodology should adapt itself to current berry or fruit picking technology and ideally, form an adjunct thereto. Finally the apparatus to perfect the method should be capable of economic manufacture and distribution.

SUMMARY OF THE INVENTION

The present invention teaches the use of a novel aperture knife adapted for use during the harvest. The aperture knife of the present invention is a generally planar structure defining at least one aperture therethrough for the neat, sanitary separation of the calyx and a small portion of the upper part of the fruit body from the balance of the fruit body itself. The aperture knife of the present invention is attachable to a variety of agricultural implements and containers utilizing attachment methodologies suitable for the equipment or containers at hand.

In use the worker takes a harvested berry and places it on the upper surface of the aperture knife of the present invention. The worker then impels the berry towards the aperture which, being generally sharpened, cleanly removes the calyx and a portion of the upper berry from the fruit body itself. As the worker continues to impel the berry towards, the calyx drops under the knife through the aperture and as the berry is impelled off the knife, it is collected in a box, bin or other collection device. Where the cleaning is performed in the field during the harvest, this methodology has the further advantage of leaving the calyxes in the field where they can be turned into compost for the next planting.

BRIEF DESCRIPTION OF THE SEVERAL VIEWS OF THE DRAWING

For fuller understanding of the present invention, reference is made to the accompanying drawing in the following Detailed Description Of The Invention. In the drawing.

Figure 1:
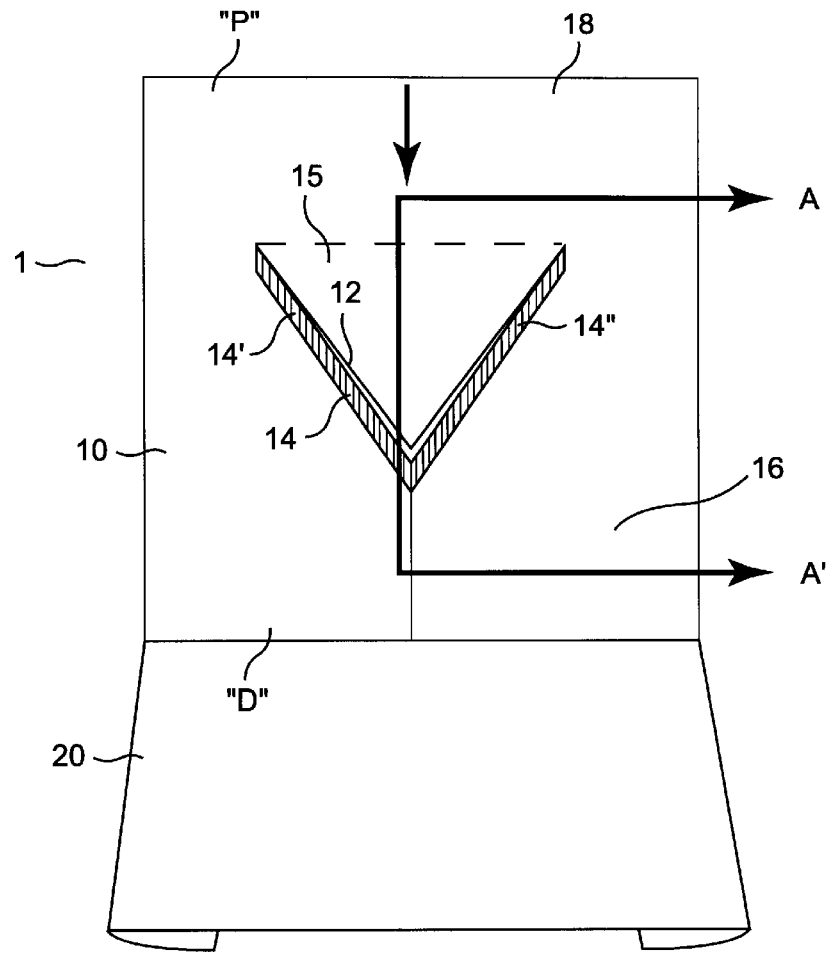
FIG. 1 is a plan view of the aperture knife of the present invention.

Reference numbers refer to the same or equivalent parts of the invention throughout the several figures of the drawing.

DETAILED DESCRIPTION OF THE INVENTION

Referring now to FIG. 1, an aperture knife constructed according to the principles of the present invention is shown. In a first preferred embodiment of the present invention, aperture knife 1 takes the form of a generally planar structure having a blade 10 in operative combination with an attachment device 20. Attachment device 20 is for attaching aperture knife 1 to a commonly encountered article of agricultural equipage or containment as will be described below.

Blade 10 is formed to define an aperture, 12, and an edge portion 14. In use it is contemplated that the portion of blade 10 here marked P will be proximal, or closest to the worker utilizing the knife. In like fashion, it is contemplated that the portion of the knife indicated by the letter D will generally be furthest from the worker. It is in this orientation that the utilization of this preferred embodiment of the present invention is explained. Distal to edge 14 and arising therefrom is a generally elevated region 16. It is across this upper surface that the bulk of the fruit body passes into a container after having been cleaned. Alternative knife arrangements including one whereby the worker first starts the fruit at the distal portion of the knife impelling it towards the proximal portion of the knife as well as lateral or other configurations are also contemplated by the principles of the present invention.

Having further reference to FIG. 1, the first preferred embodiment is further described as follows: aperture knife 1 is formed with blade 10 defining a generally proximal planar region 18 where the worker first places the berry in a substantially inverted alignment. Also formed on blade 10 is an elevated section 16. In a first preferred embodiment of the present invention elevated portion 16 takes the form of a longitudinally raised section in operative combination with an aperture 12 which defines an edge region 14. Edge 14 may be sharpened according to the degree of sharpness desired, as shown. Alternatively, edge 14 may be formed by the fabrication of aplitude knife 1 from sufficiently thin material that the cut edge of the material is sufficiently sharp to sever the calyx from the fruit body. Edge 14 in operative combination with raised portion 16 provides for an inverted V-shaped knife which engages a portion of the fruit thereby severing it from the fruit body, discussed in detail herebelow.

Blade 10 is in operative combination with an attachment device for attaching the aperture knife to another structure. This attachment device enables a worker to remove the calyx from a fruit item, particularly a strawberry, in one motion utilizing only one hand. This then enables, for the first time, a means of cleanly severing the calyx from the fruit in a manner sufficiently efficient to enable the commercial viability of the process. It should be noted that previous manual methods either resulted in excessive fruit, and hence profit, loss during calyx removal, or were performed by workers utilizing two hands and a knife and a cutting board. This latter methodology is both inefficient and expensive.

Convex blade 10 of aperture knife 1 arises a vertical distance with respect to the plane of planar section 18. Convex blade 10 defines an edge 14 vertically convex with respect to the plane of said planar section 18. Moreover, convex blade 10 and edge 14 in operative combination define a vertical apeture 12 formed a vertical distance above the plane of the planar section. Edge 14 is formed of at least one, and preferably two, knife edges 14' and 14". Knife edges 14' and 14" join to form a blade apex 17 extending a vertical distance with respect to the plane of planar section 18. Furthermore, knife edges 14' and 14" define and form a guide for centering the produce item with respect to apex 17.

Figure 2:
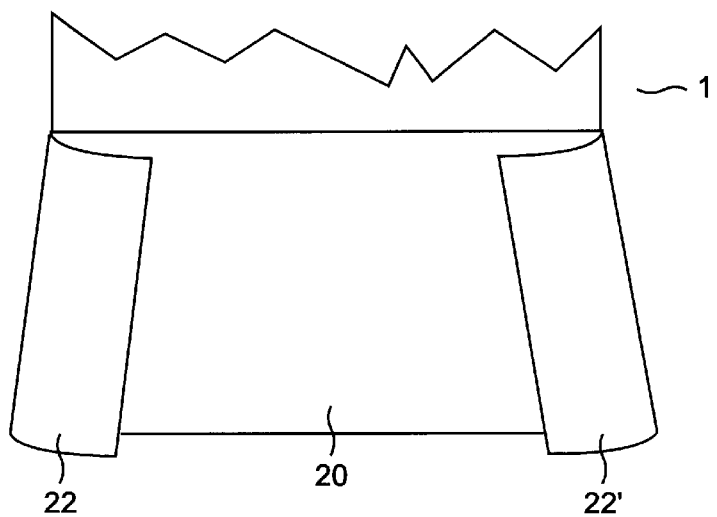
FIG. 2 is an obverse plan view of the attachment device of the present invention.
Figure 6:
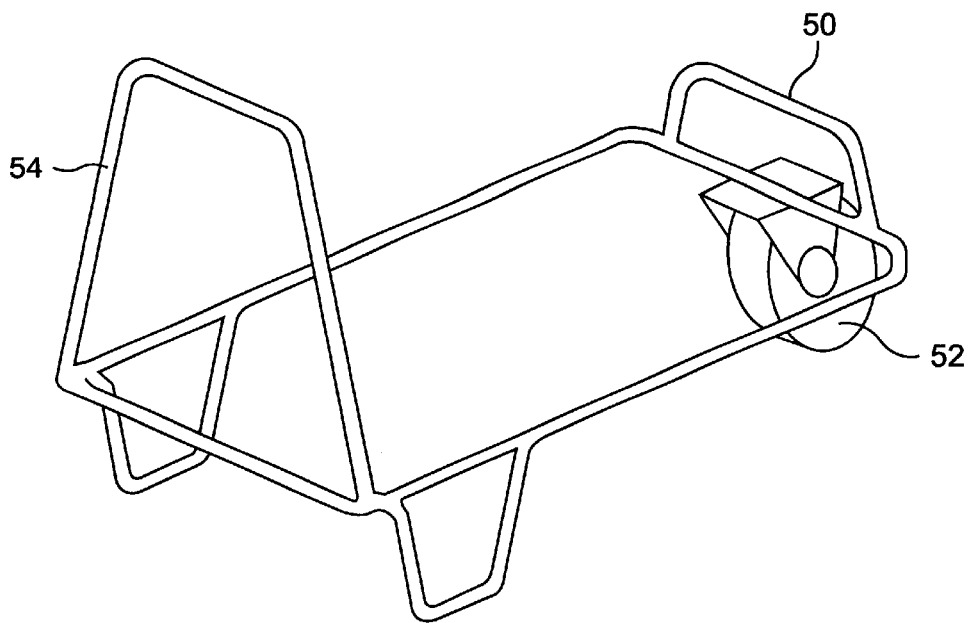
FIG. 6 is a prior art representation of a picking cart to which aperture knife 1 of the present invention is rendered attachable.
Figure 7:
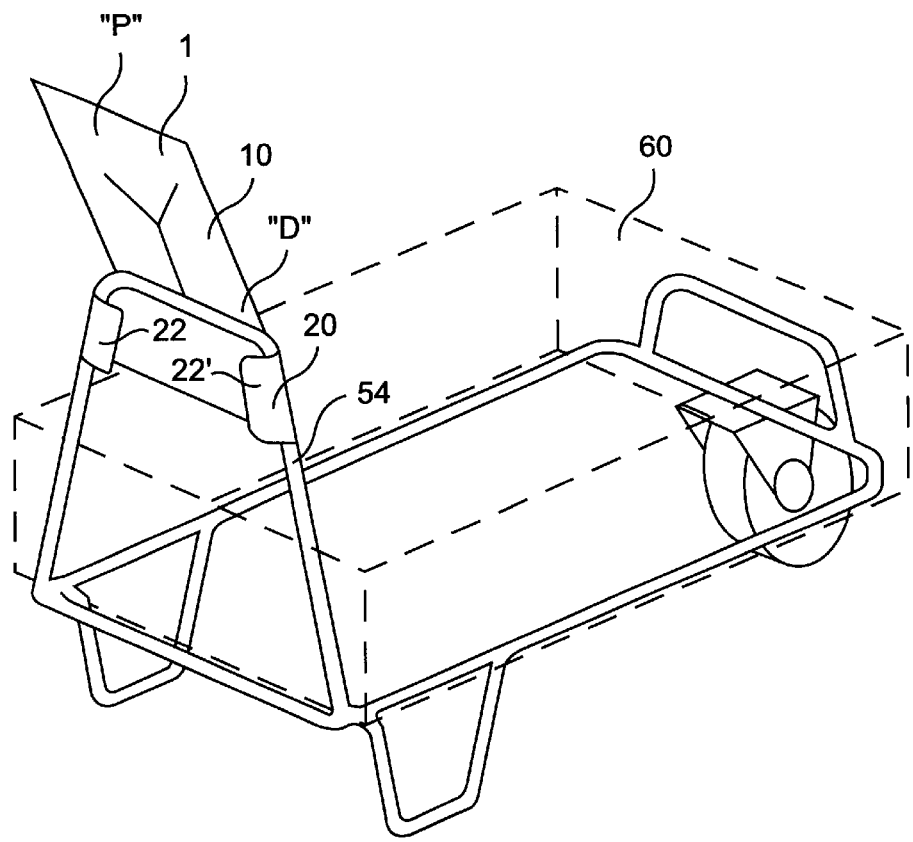
FIG. 7 is a representation of a picking cart having an aperture knife according to the principles of the present invention attached thereto.

Having continuing reference to FIG. 1, and with further reference to FIGS. 2, 6, and 7, one attachment methodology whereby the aperture knife of the present invention is rendered attachable to a commonly found item of berry harvesting equipment is discussed. Referring now to FIG. 6, a prior art strawberry picking cart, 50, is shown. Picking cart 50 comprises a wheeled structure having a means thereon for receiving a picking box or other container, not shown. In use a picking box is set into picking cart 50 and the worker manually moves the cart and box along the berry row during the harvesting process. This the worker is enabled to do by means of wheel 52 as well as handle 54. Handle 54 generally takes the form of an elevated regular trapezoid form and is, like the balance of the cart, often made of tubing, pipe, wire or the like. To removably attach the aperture knife of the present invention to picking cart 50, attachment device 20 takes the form of a generally matching trapezoidal angle and further defines a pair of recursively formed wings 22 and 22'. To attach aperture knife 1 to picking cart 50, as shown in FIG. 7, wings 22 and 22' are positioned over handle 54 of picking cart 50 and the device lowered into position where it is received onto handle 54 and retained in position by gravity and friction. As is shown in FIG. 7, this configuration places aperture knife I with the proximal end of aperture knife 1 closest to the worker standing near the handle 54, and the distal end of aperture knife 1 at or near picking box 60. Moreover, any such reversible attachment methodology enables the rapid cleaning and disinfection of the device in the field by the facile removal of the knife and subsequent sterilization. Sterilization may be performed by any sterilizing means known to those having ordinary skill in the art, including but not necessarily limited to: immersion in chlorine, iodophor or the like; the application of heat; boiling; soap; or other known cleaning or sterilizing means. Finally, the principles of the present invention contemplate attaching the aperture knife to the worker or his clothing by straps, hook-and-loop tape, clips, snaps, zippers, patent fasteners, or other attachment methodologies known to those having ordinary skill in the art.

Figure 3:
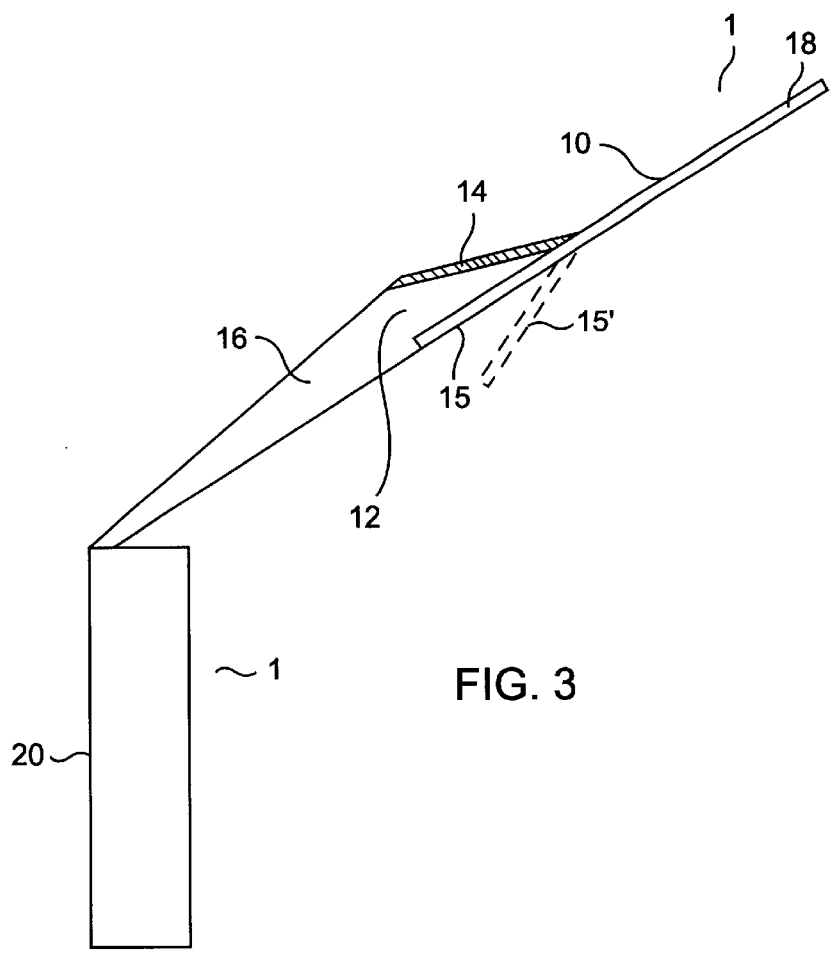
FIG. 3 is a transverse section through several of the elements of the aperture knife of the present invention.
Figure 4:
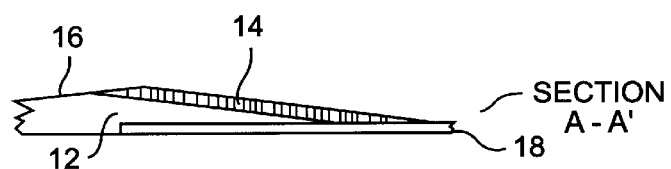
FIG. 4 is a section through the knife aperture showing the relationship of the knife edge to the elevated portion of the aperture knife.
Figure 5:
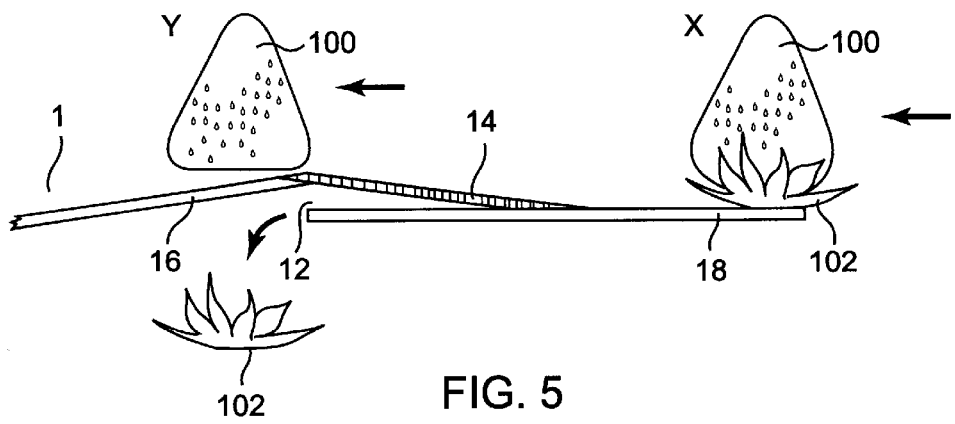
FIG. 5 is a section through aperture knife 100 in use showing the methodology of that use.

Referring now to FIGS. 3, 4, and 5, the operation of aperture knife 1 is explained. A cross section, A–A', as shown in FIG. 1, is detailed in FIG. 4. Study of this figure reveals that the formation of aperture 12, not shown, results in a transition of generally planar section 18 to elevated section 16. This transition is formed along knife edge 14 which serves to clean the berries. FIG. 3, a cutaway section through aperture knife 1, details the relationship of the several sections of the knife.

Figure 8:
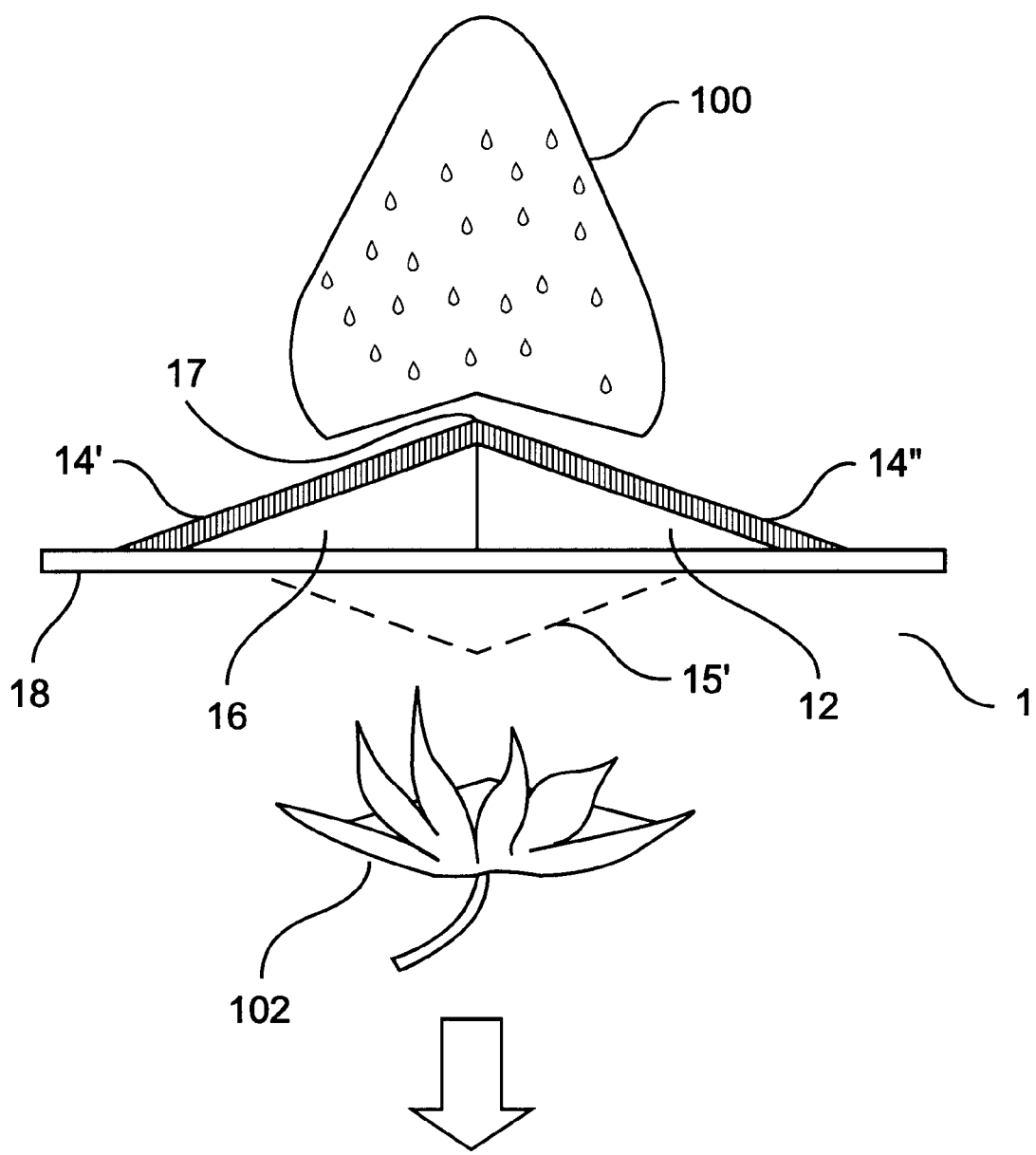
FIG. 8 is an elevation through the knife and elevated section of the aperture knife.

Referring now to FIGS. 8 and 3, the elevation of aperture 12 with respect to planar region 18 and elevated region 16 is shown. In a first preferred embodiment, substantially as shown in FIG. 8, planar region 18 extends distally to form tongue 15. The altitude of tongue 15 with respect to elevated region 16 defines the vertical extent of aperture 12. This determines the amount of calyx and berry shoulder removed during operation of the device.

A further alternative contemplates adjusting the angle of tongue 15 with respect to planar section 18, thereby forming tongue 15' as shown in FIG. 3. This embodiment may obviate the need to actually form elevated region 16 is some applications.

Referring now to FIG. 5, the method of using aperture knife 1 is shown. A worker places berry 100 in an inverted manner at planar section 18, which it will be recalled in this embodiment, is generally closest or proximal to the worker. Grasping berry 100 with one hand, the worker urges or impels berry 100 towards elevated section 16 and knife edge 14. As the berry 100 contacts knife edge 14, the two arms, not shown, of knife edge 14 simultaneously urge the berry 100 into generally central alignment with respect to knife edge 14. Referring now to FIG. 1, it will be appreciated that knife edge 14 is, in this embodiment, a generally V-shaped structure formed by the creation of a generally V-shaped aperture 12. Accordingly, knife edge 14 further comprises edges 14' and 14". It has been found that the use of converging edges 14' and 14" enables the rapid accurate placement and cutting of berries with the apparatus. Alternative edge geometries, including arcuate edges, straight edges, and polygonal edges may, with equal facility, be implemented. In implementing these differing edge geometries, alternative tongue geometries may be formed. Such tongue geometries include forms corresponding to the knife, as shown herein, as well as tongue geometries differing from the knife geometry. An example of this latter embodiment would be the use of an arcuate tongue with an angled blade.

Having continued reference to FIG. 5, as berry 100 is urged in the direction indicated, the converging nature of edges 14' and 14" engages the shoulder of the berry nearest its calyx 102. As the berry 100 is continually urged along aperture knife 1, the cut through either side of the berry is joined and completed, thereby freeing calyx 102 from berry 100. A continuation of the worker's motion urges berry 100 towards a collection device, for instance a container, not shown.

A first preferred embodiment of the present invention is formed from corrosion resistant sheet metal, formed substantially as discussed. This formation may be by means of stamping, welding, casting, or other metal fabrication means well known to those having ordinary skill in the art. Alternatively, the present invention may, with equal facility, be implemented utilizing a number of alternative materials including but not necessarily limited to plastics, fiber reinforced plastics, ceramics, or composites or combinations of the foregoing.

The first preferred embodiment of the present invention is preferably formed as a single piece. One alternative embodiment contemplated by the principles of the present invention is the formation of the aperture knife thereof by two or more parts. This "two-part" embodiment may be formed with several methodologies, as shown in FIGS. 9 through 14.

Figure 9:
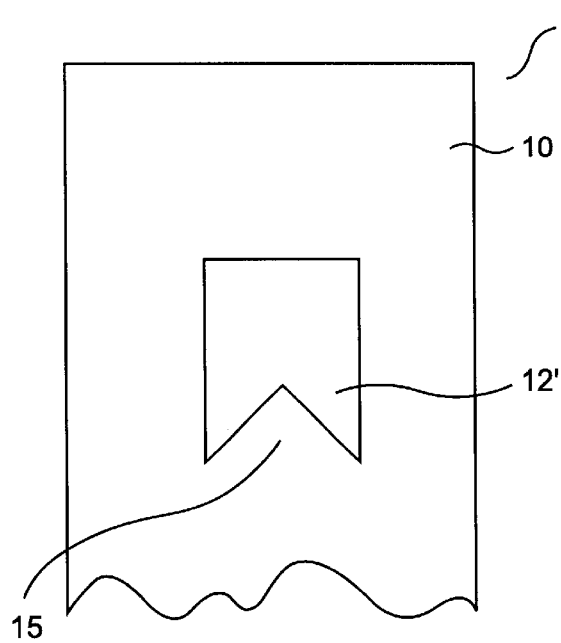
FIG. 9 is a plan view of the blade region according to a second preferred embodiment of the present invention.
Figure 10:
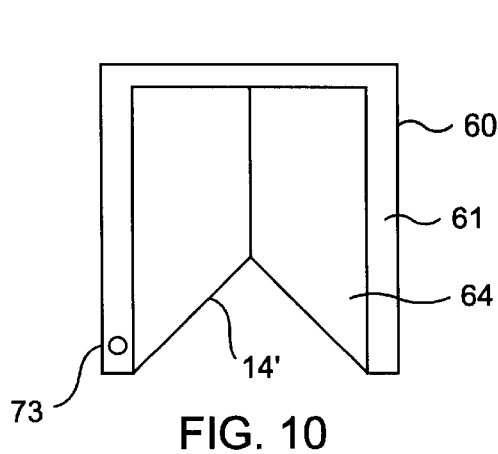
FIG. 10 is a plan view of a blade element for operative combination with the blade region of the second preferred embodiment.
Figure 11:
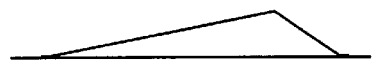
FIG. 11 is a side view of the blade element for operative combination with the blade region of the second preferred embodiment.
Figure 12:
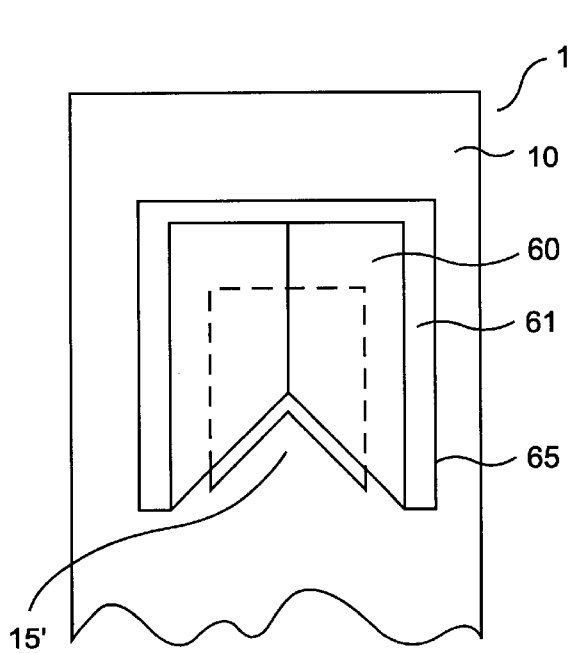
FIG. 12 is a plan view of second preferred embodiment of the present invention.
Figure 13:
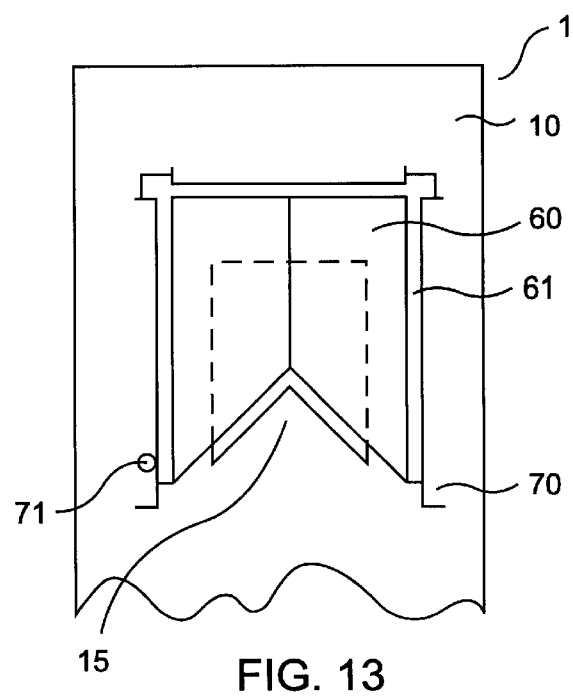
FIG. 13 is a plan view of second preferred embodiment of the present invention, implementing a removable version of the blade element.

Having reference now to FIG. 9, the blade 10 of aperture knife 1 is shown. In this embodiment, aperture 12' is formed substantially as shown, aperture 12' further defining tongue 15. In operative combination with blade 10 is blade element 60 shown in FIG. 10. Having reference to that figure, blade element 60 includes an elevated portion 64 similar to elevated section 16 shown in FIG. 8. Additionally, blade element 60 comprises a substantially planar lip 61 extending around one or more edges of elevated section 64. Optionally, the detent receiver 73 would be formed in one or more portions of lip 61. Detent receiver 73 will be explained below. A side view of blade element 60 is shown in FIG. 11.

Blade element 60 may be attached to blade 10 in substantially any manner known to those having ordinary skill in the art. In one version of this embodiment, blade element 60 is positioned over aperture 12', as shown. After placement of blade element 60 over aperture 12' blade element 60 is permanently affixed to blade portion 10 by means of welding lip 61 at one or more places around its periphery, as at 65. Alternative permanent attachment methodologies, including but not necessarily limited to brazing, soldering, riveting, spot welding, impulse welding, and the like may, with equal facility, be implemented.

Figure 14:
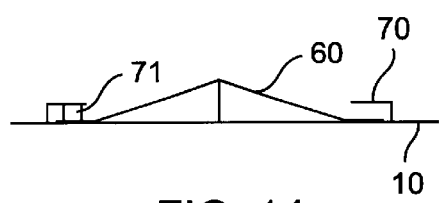
FIG. 14 is a front view of second preferred embodiment of the present invention, implementing a removable version of the blade element.

Another version of this embodiment contemplates that blade element 60 may be rendered removable from blade portion 10 for means of cleaning, sharpening, or other maintenance functions. To implement this embodiment, one or more raised receivers, 70, is formed in blade portion 1. In this embodiment blade element 60 is slidably received into receivers 70, and is retained in place by one or more detents 71 formed in receiver 70 which is further received into detent receiver 73 shown in FIG. 10. In this manner, blade element 60 is retained in position over aperture 12' yet is rendered removable for the previously discussed maintenance functions. Again, alternative removable attachment methodologies may, with equal facility, be implemented to perform this function. These methodologies include, but are again not necessarily limited to: screw fasteners; bolts and nuts; patent fasteners such as Dzus® fasteners; pins, including cotter pins; clips; and the like. A front view of this embodiment is shown at FIG. 14.

The attachment device 20 previously discussed details one attachment methodology contemplated by the present invention. It will again be obvious to those having ordinary skill in the art that alternative attachment methodologies whereby the aperture knife of the present invention is rendered attachable, particularly reversibly attachable, to an article of agricultural equipment, processing equipment, or the like may with equal facility be implemented. These attachment methodologies include, but are again not necessarily limited to: screw fasteners and the like, rivets, patent fasteners such as Dzus® fasteners, brackets, clamps, patent fasteners, hook-and-loop tape, adhesives, weldments, and other attaching methodologies known to those having ordinary skill in the art.

Figure 15:
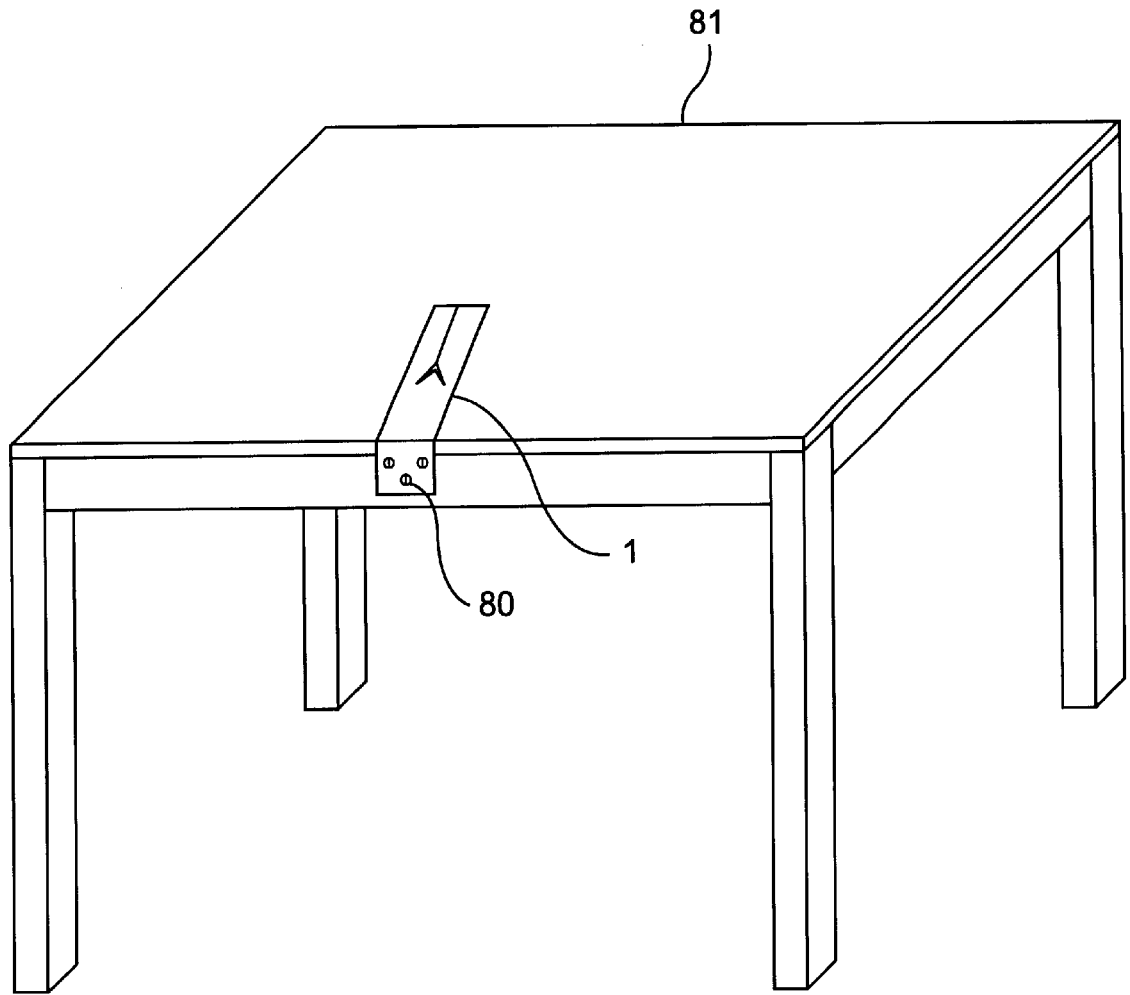
FIG. 15 is a representation of an article of agricultural processing equipment having an aperture knife.

Having reference now to FIG. 15, the aperture knife of the present invention is shown attached by means of a plurality of screw fasteners to an article of agricultural processing equipment, in this case a table. The principles of the present invention specifically contemplate the utilization thereof on a wide variety of articles of known agricultural processing equipment, the presented table being merely an exemplar thereof. Moreover, as previously discussed, the present invention contemplates a number of alternative attachment methodologies, the screw fasteners shown in this figure merely being exemplars of those attachment methodologies.

Figure 16:
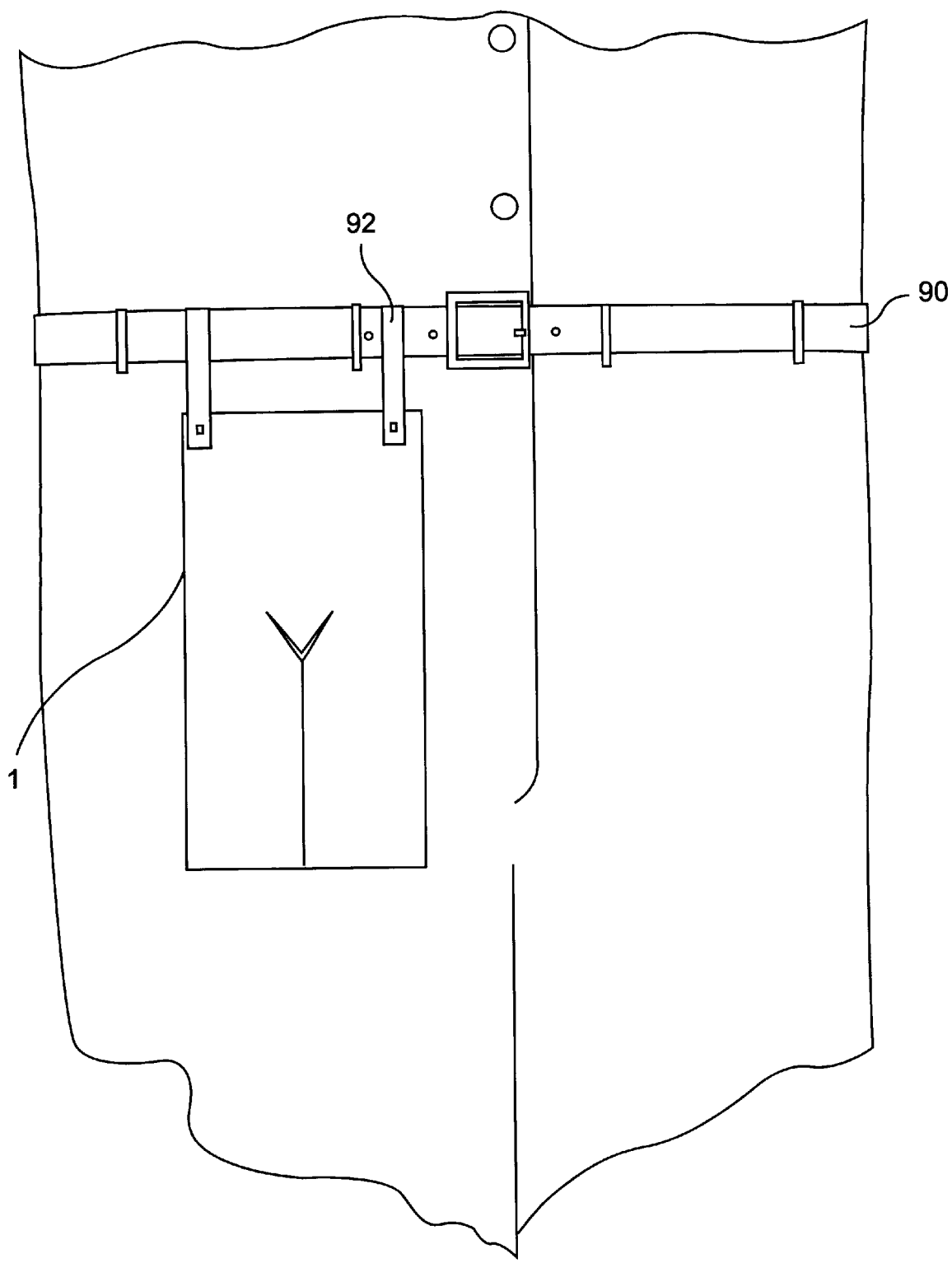
FIG. 16 a representation of an article of clothing having an aperture knife.

Referring now to FIG. 16, the aperture knife of the present invention is shown attached by means of a plurality straps to an article of clothing, in this case a worker's belt. Belts are well-known articles of clothing. The principles of the present invention specifically contemplate the utilization thereof on a wide variety of articles of clothing, the presented belt being merely an exemplar thereof Moreover, as previously discussed, the present invention contemplates a number of alternative attachment methodologies, the straps shown in this figure merely being exemplars of those attachment methodologies.

The present invention has been particularly shown and described with respect to certain preferred embodiments of features thereof. However, it should be readily apparent to those of ordinary skill in the art that various changes and modifications in form and detail may be made without departing from the spirit and scope of the invention as set forth in the appended claims. In particular, the use of the present invention with alternative attachment methodologies, knife geometries, aperture geometries, materials, and the like are specifically contemplated by the principles of the present invention. The invention disclosed herein may be practiced without any element which is not specifically disclosed herein.

We claim:

1. A method, utilizing an aperture knife, for removing an extraneous portion from a produce item, said aperture knife including a base section, a convex blade arising a vertical distance from said base section, said convex blade including a pair of convergent arms which converge to form a blade apex extending said vertical distance from said base section, which said arms further serve as two produce guide arms that converge upwardly and inwardly toward said blade apex, said two produce guide arms for centering a center of said produce item with respect to said blade apex, said center of said produce item including at least a part of said extraneous portion, said convex blade and an edge in operative combination further defining a vertical aperture formed above said base section, said method comprising:

positioning the produce item on said base section section, with at least said part of said extraneous portion in contact with said base section section;

urging said produce item along said base section towards said apex of said convex blade;

receiving said produce item, including at least a part of said extraneous portion, into said produce guide arms;

responsive to continued urging towards said convex blade, centering, with said produce guide arms, said produce item with respect to said blade apex;

forming a concave cut with said convex blade in said produce item, thereby severing said extraneous portion from said produce item; and separating, through said aperture, said extraneous portion from said produce item.

2. The method of claim 1 wherein at least a portion of said base section and said convex blade form, in operative combination, a cut depth controller, said method further comprising controlling a depth of said concave cut in said produce item with said cut depth controller.

3. The method of claim 1 wherein said positioning further comprises inverting said produce item on said base section, with said extraneous portion in contact with said base section.

4. The method of claim 1 wherein said edge is a substantially blunt edge, said forming further comprises forming, with said blunt edge of said convex blade, said concave cut in said produce item.

* * * * *